United States Patent
Gottwald et al.

(10) Patent No.: US 8,306,432 B2
(45) Date of Patent: Nov. 6, 2012

(54) OPTICAL REGENERATOR AND PHASE ERROR DETECTION UNIT FOR AN OPTICAL REGENERATOR, AND METHOD FOR OPTICAL REGENERATION

(75) Inventors: Erich Gottwald, Holzkirchen (DE); Beate Oster, Karlsruhe (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 590 days.

(21) Appl. No.: 12/376,693

(22) PCT Filed: Aug. 3, 2007

(86) PCT No.: PCT/EP2007/058065
§ 371 (c)(1),
(2), (4) Date: Jan. 27, 2010

(87) PCT Pub. No.: WO2008/017642
PCT Pub. Date: Feb. 14, 2008

(65) Prior Publication Data
US 2010/0178063 A1 Jul. 15, 2010

(30) Foreign Application Priority Data
Aug. 7, 2006 (DE) .......................... 10 2006 036 817

(51) Int. Cl.
*H04B 10/02* (2006.01)
(52) U.S. Cl. ........ 398/175; 398/173; 398/176; 398/174; 359/326; 359/332; 359/333; 359/344; 385/24; 385/27; 385/123; 385/15
(58) Field of Classification Search .................. 398/173, 398/175, 176, 177, 180, 181, 178, 179, 174, 398/33, 38, 25, 26, 27, 37; 359/326, 332, 359/344, 237, 333; 385/1, 2, 4, 5, 15, 122, 385/123, 24, 27
See application file for complete search history.

(56) References Cited

U.S. PATENT DOCUMENTS
6,532,091 B1 * 3/2003 Miyazaki et al. ............. 398/175
(Continued)

FOREIGN PATENT DOCUMENTS
WO WO-2004/023680 A1 3/2004

OTHER PUBLICATIONS
Striegler, A. et al.; NOLM-Based RZ-DPSK Signal Regeneration; IEEE vol. 17, No. 3, Mar. 2005.
(Continued)

*Primary Examiner* — Hanh Phan
(74) *Attorney, Agent, or Firm* — Laurence A. Greenberg; Werner H. Stemer; Ralph E. Locher

(57) ABSTRACT

The invention relates to an optical regenerator for a differential phase modulated data signal which comprises, in addition to a unit for bit-by-bit gauge leveling, a unit for the regeneration of the phase of individual symbols of the differential phase modulated data signal. After the bit-by-bit gauge leveling, the data signal that is preset in amplitude is divided into a first and a second data signal. Phase errors of individual signals are detected for the first data signal in a phase error detection unit, are transformed into a correction signal, and are conveyed to a phase error correction unit. The second data signal is corrected in the phase error correction unit, depending on the correction signal conveyed thereto in the phase of said data signal, in such a way that a differential phase modulated data signal, regenerated in amplitude and in phase, is delivered at the output of the correction unit.

21 Claims, 3 Drawing Sheets

Figure 1:
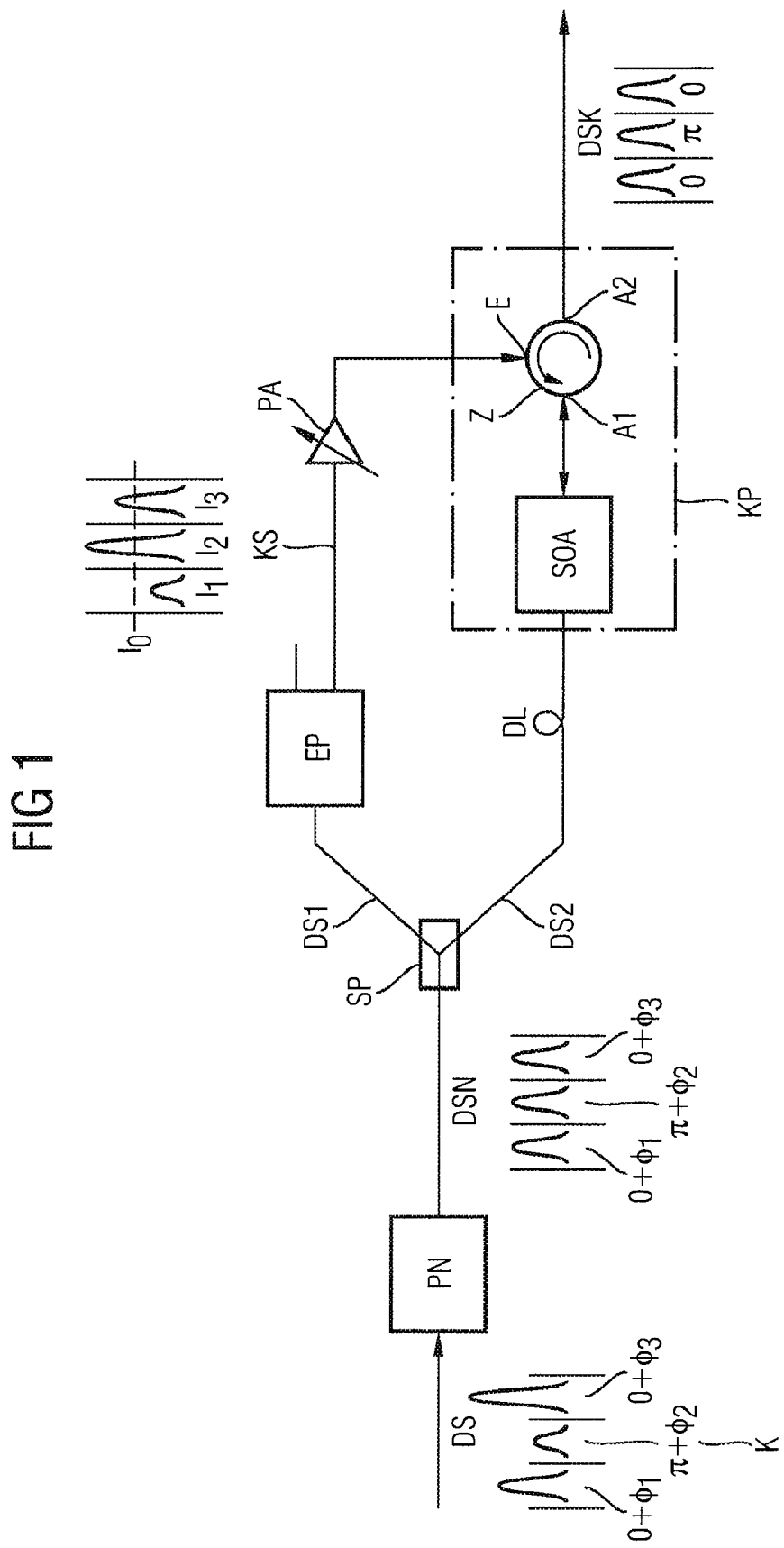

U.S. PATENT DOCUMENTS 7,369,779 B1 * 5/2008 Croussore et al. ............ 398/176

OTHER PUBLICATIONS

Pontus Johannisson, Göran Adolfsson, Magnus Karlsson; Supression of phase error in differential phase-shift keying data by amplitude regeneration; XP001242764 Bd. 31, No. 10;pp. 1385-1387, 2006.

Shin, Devgan, Grigoryan, Kumar; SNR Improvement of DPSK Signals in a Semiconductor Optical Regenerative Amplifier; XP002455596; Bd. 18, No. 1; pp. 49-51, 2005.

* cited by examiner

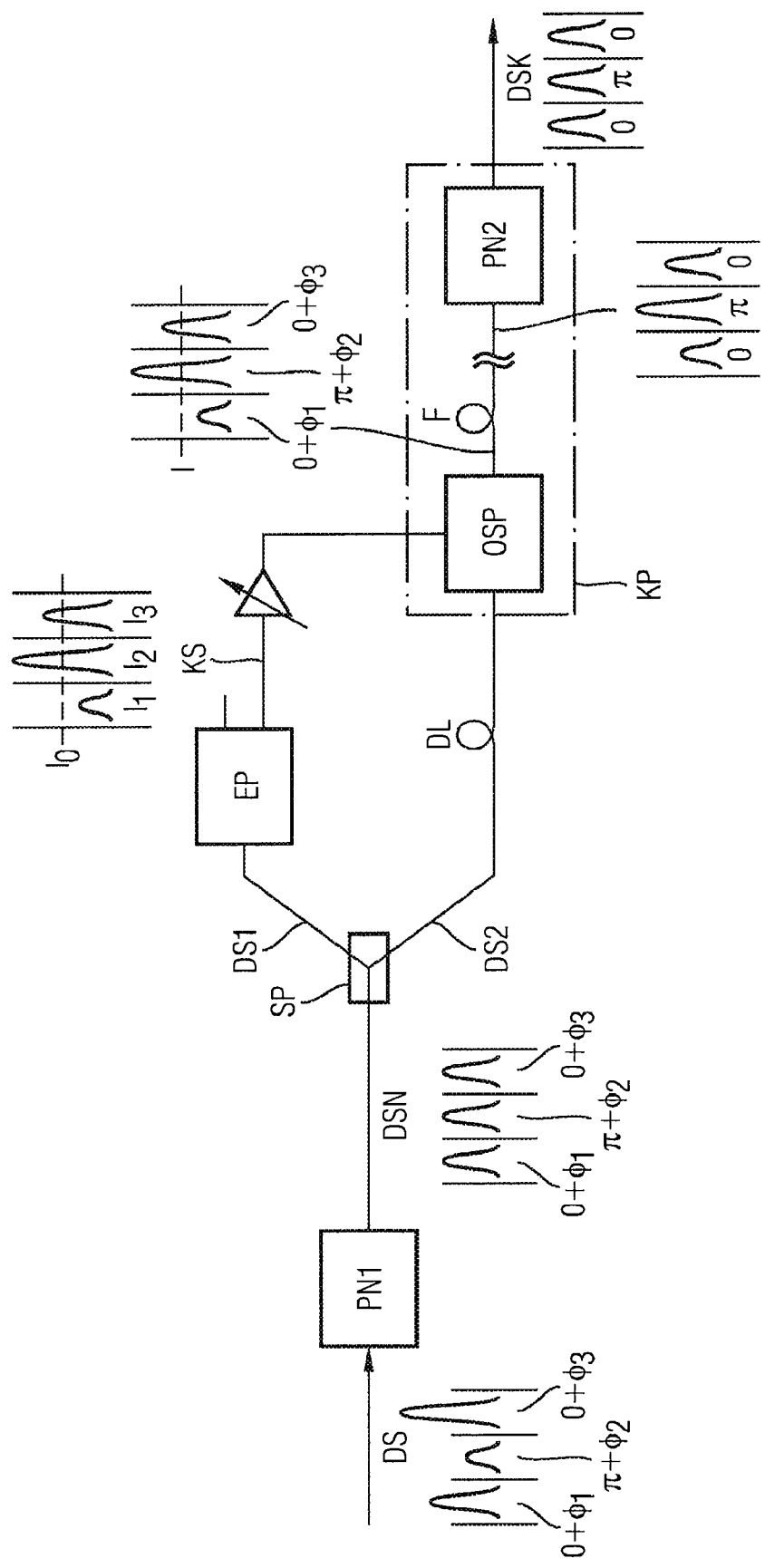

OPTICAL REGENERATOR AND PHASE ERROR DETECTION UNIT FOR AN OPTICAL REGENERATOR, AND METHOD FOR OPTICAL REGENERATION

CLAIM FOR PRIORITY

This application is a national stage application of PCT/EP2007/058065, filed Aug. 3, 2007, which claims the benefit of priority to German Application No. 10 2006 036 817.7, filed Aug. 7, 2006, the contents of which hereby incorporated by reference.

The invention relates to an optical regenerator according to the preamble of patent claim 1, to a phase error ascertainment unit for an optical regenerator and to a method for optical regeneration according to the preamble of patent claim 21.

In large optical transport networks operating using wavelength division multiplexing (DWDM for short), optical links arise which cannot be bridged without regenerating the data signal. Usually, the optical data signals are regenerated using optoelectronic regenerators in which the optical data signal is converted into an electronic signal, amplified and regenerated and then converted back into an optical signal in a transmitter unit. At very high channel data rates, for example 40 Gb/s or in the case of the future 100 Gb Ethernet, these conventional regenerators are very costly and it is alternatively appropriate to use purely optical regenerator designs. In addition, as the data rate increases, the ranges which are possible without a regenerator are often significantly shorter than the maximum path lengths which arise in the network. At a data rate of 40 Gb/s, the ranges are between 300 and 1500 km, and a data rate of 100 Gb/s, the ranges are currently significantly less than 300 km, which means that in such networks the data signal may have to be regenerated several times in a link.

Longer ranges are achieved, inter alia, through the use of advanced modulation formats such as differential phase shift keying (DPSK for short). Phase modulated signals typically have a constant optical power or an optical power which is pulsed at the symbol rate, and therefore potentially lower sensitivity to nonlinearities in the fibers. Two-stage differential phase shift keyed data signals have an improved dispersion tolerance in comparison with conventional modulation formats. Furthermore, four-stage differential phase shift keyed data signals have a high level of spectral efficiency, which means that twice the volume of information per unit time can be transmitted within an optical wavelength interval in comparison with two-stage modulated signals. However, disturbances in the amplitude and phase arise even with differential phase shift keyed data signals on account of a four-wave mixing between the channels and on account of cross phase modulation. In addition, phase errors are caused by nonlinear interactions between the data signal and the amplified spontaneous emission of the optical amplifiers. Even for differential phase shift keyed data signals, this results in a need for regenerators which correct distortions or disturbances in the data signal.

The publication by A. G. Striegler et al. "NOLM-Based RZ-DPSK signal regeneration" IEEE Photonics Technology Letters, Vol. 17, No. 3 dated March 2005 discloses a regenerator which has a nonlinear optical loop mirror (NOLM for short) with a directional attenuator. Here, a "return-to-zero" differential phase shift keyed (RZ-DPSK) input signal is fed into a coupler with a split ratio of approximately 95:5 and split. The two component signals of different amplitude pass through the fiber loop in opposite directions and undergo different phase shifts on account of the self phase modulation in the highly nonlinear NOLM fiber, which results in a nonlinear transmission characteristic. The effect achieved by inserting a directional attenuator within the fiber loop is that the amplitude fluctuations in the signal at the output of the fiber mirror are greatly reduced, while the phase of each individual symbol for the DPSK signal is retained. This means that phase errors in individual symbols of the data signal are not corrected by the NOLM design.

It is the object of the present invention to specify an optical regenerator which allows correction of phase errors for differential phase shift keyed data signals.

This object is achieved by an optical regenerator as specified in claim 1, by a phase error ascertainment unit as specified in claim 15 and by a method for optical regeneration as specified in claim 21.

The invention proposes an optical regenerator for a differential phase shift keyed data signal which comprises not only a unit for bit-by-bit level control but also a unit for regenerating the phase of the individual symbols of the differential phase shift keyed data signal. Following the level control, the data signal whose amplitude has been set is split into a first and a second data signal. For the first data signal, a phase error ascertainment unit ascertains the phase errors in the individual symbols, converting them into a correction signal and supplies said correction signal to a unit for correcting the phase errors. The second data signal has its phase corrected in the unit for correcting the phase errors on the basis of the supplied correction signal, so that the output of the correction unit outputs a differential phase shift keyed data signal whose amplitude and whose phase have been regenerated.

The use of the regeneration according to the invention allows the ranges in an optical transport network to be significantly increased, so that an electro-optical regenerator may no longer be necessary. In addition, the use of purely optical regenerators, particularly for data rates of 40 Gb/s and above, has considerable associated cost advantages. Since the regeneration is effected purely optically, there is no need for radio-frequency electronics. In addition, the arrangement according to the invention is tolerant of a variation in the data rate on account of different error correction methods.

In one advantageous variant embodiment, the correction signal is produced in the phase error ascertainment unit by converting the phase error into an amplitude value. The phase error ascertainment unit has a characteristic curve between a phase value and an amplitude value with at least one linear range, so that for different symbols of the data signal there is the same gradient of the characteristic curve. This is necessary particularly for two-stage differential phase shift keyed data signals, since regardless of the symbol of 0 or π the conversion of the phase error into an amplitude value must be the same, with the correct arithmetic sign.

The conversion of a phase value into an amplitude value, as used for ascertaining the phase error in individual symbols, can be performed using an interferometric arrangement. This can advantageously be manufactured on an integrated optical basis, which contributes to the compactness of the overall regenerator.

One advantageous variant implementation of the phase error ascertainment unit is a parallel circuit comprising a first interferometer and a second interferometer whose characteristic curve has been shifted by a phase difference π/2. The first interferometer is used to ascertain the phase errors. The second interferometer is used to detect the symbols. On the basis of the detected symbol, an optically controllable phase shifter is used to the effect that the same operating range or an operating range shifted by 2nπ is set for different symbols of the data signal in the first interferometer.

When the phase error in the individual symbols has been ascertained, the phases of these symbols are corrected in the unit for phase correction. This advantageously involves the use of nonlinear media in which the amplitude of the correction signal is taken as a basis for adjusting the phase of the second data signal. This particularly holds the advantage that data signals at very high data rates of more than 40 Gb/s can be corrected, since the Kerr effect used proceeds very quickly in time ranges of fs.

In one variant embodiment, the unit for phase correction contains a semiconductor amplifier. In this case, the cross phase modulation between the data signal and the opposed correction signal is utilized for phase shifting, which has the advantage that no additional light source is required for impressing the correction signal onto the data signal.

In another variant embodiment, the unit for phase correction utilizes the self phase modulation. This has the advantage that the correction unit used may be the transmission fiber directly or a highly nonlinear optical fiber.

Further advantageous refinements of the invention are the subject matter of subclaims and of the exemplary embodiments.

Figure 2:
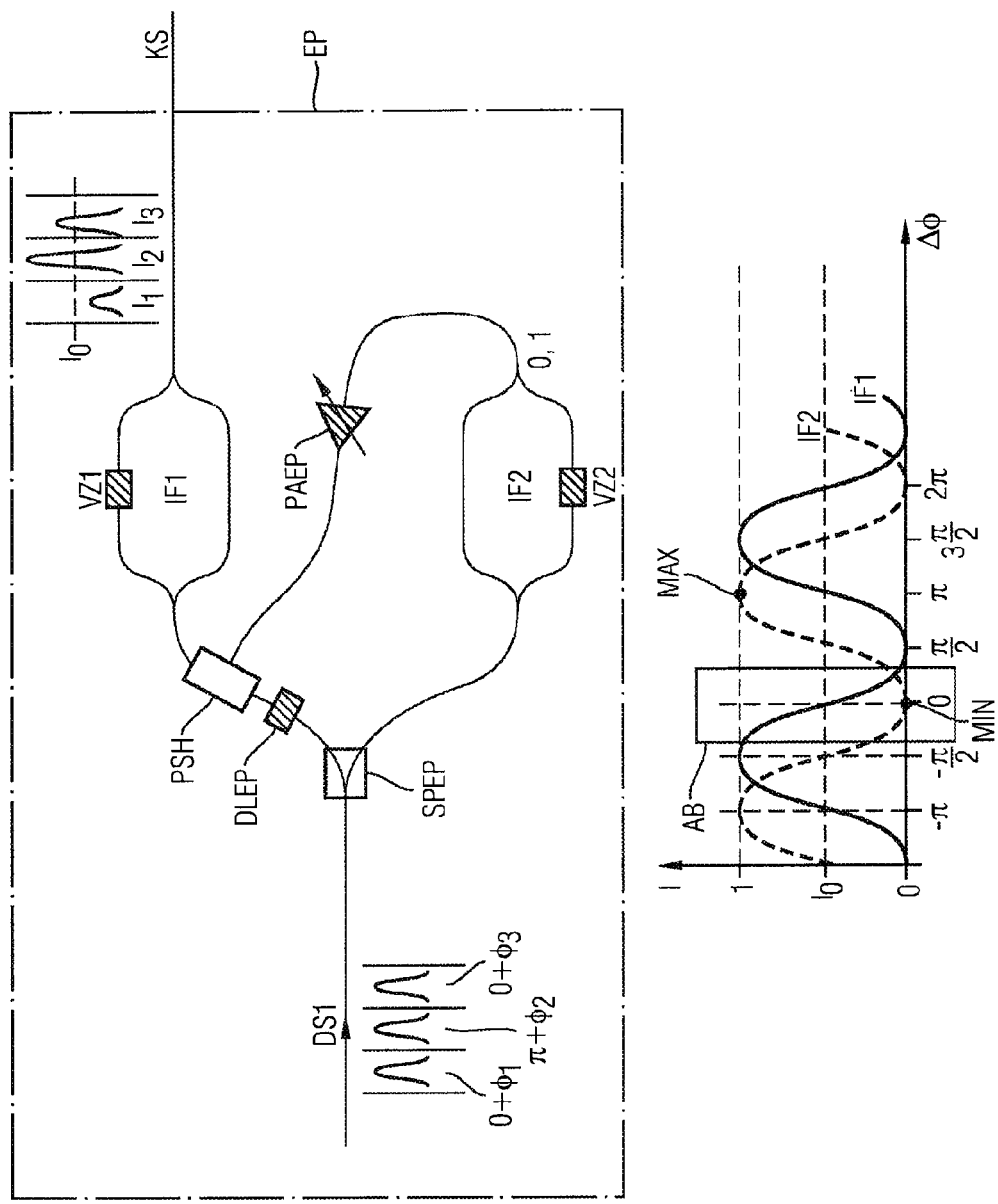

The invention will now be explained using exemplary embodiments with reference to the figures, in which FIG. 1 shows a block diagram of a first variant embodiment of the optical regenerator according to the invention, FIG. 2 shows a block diagram of a phase error ascertainment unit and associated characteristic curves, and FIG. 3 shows a block diagram of a second variant embodiment of the optical regenerator according to the invention.

FIG. 1 shows a first variant embodiment of the optical regenerator according to the invention. At a few points in the block diagram, individual data signals are shown between the function blocks in outline form for the purpose of illustration. A data signal DS is supplied to the input of the optical regenerator. In this exemplary embodiment, the input signal chosen is a "return-to-zero" differential phase shift keyed (RZ-DPSK) data signal. The use of "non-return-to-zero" differential phase shift keyed (NRZ-DPSK) data signals or of other phase modulated data signals at constant power is equally possible. An RZ-DPSK data signal comprises individual pulses whose duration is less than the bit period. An individual pulse is also called a symbol in this instance. Binary data encoding is implemented using the difference in the phase between successive symbols. In the case of two-stage differential phase shift keyed data signals, adjacent symbols of the data signal respectively differ by 0° or by 180° (=π). In the undistorted case, the signal amplitudes of each symbol are the same. In FIG. 1, the data signal DS is disturbed on account of nonlinear interactions along the transmission link. As can be seen from the outline of the data signal DS, the individual symbols of the data signal DS have signal amplitudes at different levels. The phases of the individual symbols are now disturbed by a value φ, i.e. the phase differences in adjacent symbols are no longer precisely 0 or π. As the data signal is propagated further, the phase errors can become so large that it is no longer possible to correctly distinguish between the individual symbols.

The data signal DS whose amplitude and phase have been disturbed in this manner is supplied to a unit for level control PN which is used to compensate for the amplitude differences between the individual symbols and to fix them at one value. This can be done using a modified nonlinear loop mirror, for example, as is known from the prior art document by Striegler et al. At the output of the unit for level control PN, all the symbols of the leveled data signal DSN have the same signal amplitudes. The phase and hence also the phase errors of the individual symbols are essentially maintained, however.

The data signal DSN whose amplitude has been corrected is supplied to a splitter SP, where it is split into a first data signal DS1 and into a second data signal DS2. If a passive 50:50 splitter PS is used, the power levels of the pulses of each data signal are halved. If an active splitter is used, which has an amplifying medium integrated in it, this splitter can be operated such that each of the two outputs of the splitter SP provides an accurate-level copy of the input signal. In principle, the form of the splitter SP and its split ratio can be chosen arbitrarily.

The first data signal DS1 is supplied to a phase error ascertainment unit EP. This unit has the task of determining the phase error φ in a symbol in reference to the undisturbed phase differences in adjacent symbols of 0 or π and, for each symbol k, of converting it into an optical level proportional to the phase error of φk in the symbol. This optical level will then be used for correcting the phase errors in the data signal utilizing nonlinear effects such as cross phase modulation XPM or self phase modulation SPM. To this end, the unit for phase correction KP is provided. KP corrects the second data signal DS2 using the optical level of a correction signal KS.

The phase error ascertainment unit EP needs to be in a form such that defined conversion of the phase of the signal pulses of the individual symbols into an amplitude takes place. Regardless of whether a signal disturbance is present, the unit EP needs to provide a base level $I_0$ which preferably results in a π/2 phase shift for all signal pulses in the downstream correction unit KP, so that the phase differences between successive symbols are maintained. The transmission characteristic of the unit EP, i.e. the dependence of the transmitted intensity on the phase difference in successive symbols, should be linear in the range around 0 or π and should have the same gradient for both ranges. Thus, when the characteristic curve has a negative gradient S, for example, a phase error of +φk in a symbol produces a transmission change of ΔI~φk. In this case, the correction signal KS for a symbol k has the level Ik=I0−|S|*φk. In the phase correction unit KP, the correction signal produced in this manner results in a phase shift which is proportional to the intensity of the correction signal for a symbol Ik on account of the Kerr effect. Since the intensity of the correction signal is below the base level I0 in this example, the phase of the symbol k to be corrected for the second data signal DS2 is corrected by −φk in relation to an error-free symbol.

The phase errors can be ascertained using an interferometric arrangement, for example. One variant implementation of a phase error ascertainment unit of this kind is shown by means of a block diagram in FIG. 2. This unit contains two parallel-connected Mach-Zehnder interferometers IF1 and IF2 whose operating points are shifted with respect to one another by π/2 or a multiple of π/2 (π/2+2nπ, where n=1, 2, 3 . . . ). The associated characteristic curves for the interferometers, i.e. the transmission on the basis of the phase difference in adjacent symbols, are shown beneath the block diagram.

The first interferometer IF1 is used to ascertain the phase errors φ. The second interferometer IF2 is used to detect the symbol values 0 or π. Both interferometers are in the form of DPSK demodulators and differ only in their operating points, i.e. the operating point of the first interferometer is at half the maximum transmission of the second interferometer.

The second interferometer IF2 is required in order to set the same operating range AB for all symbols in the interferometer IF1. Finally, setting the phase correction requires a linear characteristic curve which has the same gradient both for symbols in the range around 0 and for symbols in the range around π. In this case, this is achieved by virtue of the first interferometer IF1 having a unit for phase shifting PSH arranged upstream of it. This unit shifts the phase of an incoming symbol by precisely π when the symbol π, for example, has been detected for this symbol in the second interferometer IF2. In this case, the phase errors φ are maintained. They are now always ascertained in the same operating range AB of the first interferometer IF1 and are output as an optical level at the output of the first interferometer IF1.

The incoming data signal DS1 is split in a splitter SPER at the input of the phase error ascertainment unit EP. The first component signal is supplied to the delay unit DLEP. The delay time is set such that the first component signal is applied to the phase shifter PSH at the correct time only when the symbol value has been detected in the second interferometer IF2. Propagation time differences which are caused by the signal path of the second component signal are therefore compensated for by means of the delay unit DLEP.

The second component signal is supplied to the second interferometer IF2. This is operated in the manner of a DPSK demodulator. One of the interferometer arms contains a delay unit VZ2 which produces a propagation time difference of roughly one bit period. Depending on the phase difference between the two signals in the interferometer arms, constructive or destructive interference occurs at the outputs of the interferometer. In this way, the output of the interferometer IF2 provides a transmission of 0 or 1 on the basis of the phase difference in successive symbols of 0 or π.

The points of maximum transmission MAX and minimum transmission MIN are marked in the characteristic curve IF2 shown in dashes in FIG. 2. Phase errors in the individual symbols have only a slight effect on the detection result, since the gradient of the characteristic curve at the minima and maxima is very shallow.

The output of the second interferometer IF2 is connected to an optically controllable phase shifter PSH, which may be in the form of a nonlinear medium, for example, and is arranged upstream of the input of the first interferometer IF1. Previously, the levels which are output at the output of IF2 are supplied to a level matcher PAEP. This level matcher sets the level in the range around the transmission 1 to a value which has been firmly defined beforehand and which produces a phase shift of π precisely. A one level accordingly results in the phase shifter PSH shifting the phase of the associated symbol of the first component signal by π. The phase shift can likewise be achieved by a nonlinear effect such as the XPM. The form of the optically controllable phase shifter PSH is freely selectable. What is crucial is that the most accurate possible phase shift by π takes place. Alternatively, the optically controllable phase shifter PSH may also be arranged in one of the interferometer arms of the first interferometer IF1. In this case, the operating point of the interferometer IF1 is shifted by π for a fixed symbol value. Metaphorically speaking, one can imagine this phase shift in FIG. 2 as a shift in the solid characteristic curve IF2, where a logic zero (symbol 0) or logic one (symbol π) are both situated on a falling or rising edge of the transmission characteristic.

If the optically controllable phase shifter PSH is arranged upstream of the input of the interferometer IF1, the first interferometer IF1 may advantageously be in the same form as the second interferometer IF2. The first interferometer IF1 now ascertains for each symbol k an optical level Ik which is proportional to the phase error φk therein.

The variant implementation of a phase error ascertainment unit as shown in FIG. 2 can be manufactured in integrated optical form on an InP basis, for example. Other materials such as silicon, glass or lithium niobate are also conceivable. In principle, it is also conceivable to extend the phase error ascertainment unit described here for four-stage differential phase shift keyed data signals. This requires a third interferometer IF3 which is connected in parallel with the second interferometer. If the output level of the third interferometer IF3 is doubled, four symbols are ascertained. The interferometer output of the second and third interferometers can be connected to a phase shifter. On the basis of the ascertained symbols, at least two phase shifters are required in order to ensure the same mode of action of the first interferometer IF1 for the individual symbols.

The correction signal KS which is output at the output of EP now has pulses whose amplitude varies by a constant level I0 on the basis of the phase errors φk in each individual symbol k. The correction signal KS is supplied to a unit for phase correction KP which, in the exemplary embodiment shown in FIG. 1, comprises a semiconductor amplifier SOA and a downstream circulator Z. The input E of the circulator has the correction signal KS applied to it. This signal is routed to the first output A1 and supplied to the semiconductor amplifier SOA. The semiconductor amplifier SOA is operated at constant gain in the linear range, so that the correction signal does not change the gain. The correction signal KS passes through the SOA in the opposite direction to the second data signal DS2. The cross phase modulation XPM is used to shift the phase of each symbol of the second data signal DS2 on the basis of the level of the correction signal for the same symbol, as already described further above. According to the outline in FIG. 1, the phase of the first symbol (0+φ1) is shifted by −φ1 (since I1<I0) in proportion to the intensity of the correction signal I1 in relation to an error-free symbol, for example. The second symbol (π+φ2) is corrected by +φ2 (since I2>I0), and the third symbol (0+φ3) is corrected likewise by +φ3 (since I3>I0).

The output of the unit for phase correction KP outputs a data signal DSK whose amplitude and phase have both been corrected. The amplitude levels of all the symbols are the same and there is a phase difference of 0 or π between the respective adjacent symbols.

To match propagation time differences between the first data signal DS1 and the second data signal DS2, the unit for phase correction KP has a delay line DL inserted upstream of it. In addition, the correction signal KS can be amplified to a mean level using a controllable amplifier. Level matching is advantageous, since within the SOA a nonlinear effect (in this case the XPM) is utilized whose efficiency increases with the intensity or the level of the correction signal KS.

FIG. 3 shows a second variant embodiment of the optical regenerator according to the invention. In this case, the unit for phase correction KP comprises a series circuit comprising an optically controllable level adjuster OSP, a transmission fiber F and a second unit for level control PN2. The correction signal KS is in this case used to impress upon the second data signal DS2 level differences which are proportional to the phase error φ. This is done using an optically controllable level adjuster OSP. This may be an optically controllable amplifier or attenuator, as alternatives. The output of the controllable level adjuster OSP provides the second data signal DS2, whose signal amplitudes vary by an average constant level I on the basis of the phase errors φk in each individual symbol k. The actual phase correction takes place in the subsequent transmission fiber F. In contrast to the variant embodiment from FIG. 1, it is not the cross phase modulation XPM which is utilized for phase correction in this case but rather the self phase modulation SPM in the fiber F. The transmission fiber may also be in the form of a highly nonlinear fiber, or it may be a transmission fiber on the transmission link. At the output of the fiber, the phase errors in each individual symbol are corrected on the basis of the nonlinear phase shift within the fiber. Since the different signal amplitudes of the symbols are not influenced by the SPM, it is possible to compensate for the level differences in the individual symbols prior to a downstream reception unit, for example, in a second unit for level control PN2.

As an alternative to the transmission fiber F, a semiconductor amplifier SOA can also be used for the phase correction. Changes in the charge carrier density in the semiconductor amplifier results in changes in the refractive index in the SOA. This means that a phase shift in a symbol can likewise take place on the basis of the intensity of a signal pulse, which in this case is utilized for phase correction.

Finally, it is noted that the phase error ascertainment unit according to the invention can be used not only for an application in the optical regenerator according to the invention but also for other purposes. By way of example, it can either be fitted in a regulator as a detector for signal distortions or it can be used for signal analysis, for example in conjunction with a dispersion compensator. It furthermore is conceivable for it to be used as a detector for additional (analog or digital) information which has been impressed on the data signal as submodulation.

The invention claimed is:

1. An optical regenerator for a differential phase shift keyed data signal (DS), whose input side comprises a unit for bit-by-bit level control (PN, PN1) in which the same amplitude is set for each symbol of the differential phase shift keyed data signal (DS),
   in that the unit for level control (PN) is followed by a splitter (SP) having two outputs, in which the data signal (DS) whose amplitude has been set is split into a first data signal (DS1), which is output at a first output, and is split into a second data signal (DS2), which is output at a second output,
   in that the first output of the splitter is connected to a phase error ascertainment unit (EP) in which a phase error in the supplied first data signal (DS1) is taken as a basis for producing a correction signal (KS) and outputting it at its output,
   in that the output of the phase error ascertainment unit (EP) is connected to a first input of a unit for correcting the phase errors (KP), the second input of which is connected to the second output of the splitter (SP), so that the unit for correcting the phase errors (KP) corrects the phase of the second data signal (DS2) on the basis of the supplied correction signal (KS) and its output outputs a differential phase shift keyed data signal (DSK) whose amplitude and whose phase have been regenerated.

2. The optical regenerator as claimed in claim 1, characterized
   in that the phase error ascertainment unit (EP) has a characteristic curve which represents a correlation between a phase value and an amplitude value and which has at least one linear range, so that for different symbols of the data signal (DS) there is the same gradient of the characteristic curve.

3. The optical regenerator as claimed in claim 2, characterized
   in that the phase error ascertainment unit (EP) is in the form of an interferometric arrangement.

4. The optical regenerator as claimed in claim 3, characterized
   in that the phase error ascertainment unit (EP) is in the form of a parallel circuit comprising a first interferometer (IF1) with an optically controllable phase shifter (PSH) and a second interferometer (IF2) whose characteristic curve has been shifted by a phase difference,
   wherein the input of the first interferometer (IF1) has a delay unit (DLEP) connected upstream of it, and
   the output of the second interferometer (IF2) is connected to the optically controllable phase shifter (PSH) via a level adjuster (PAEP).

5. The optical regenerator as claimed in claim 4, characterized
   in that the optically controllable phase shifter (PSH) is connected between the delay unit (DLEP) and the input of the first interferometer (IF1).

6. The optical regenerator as claimed in claim 4, characterized
   in that the optically controllable phase shifter (PSH) is arranged in one interferometer arm of the first interferometer (IF1).

7. The optical regenerator as claimed in claim 4, characterized
   in that the first interferometer (IF1) and the second interferometer (IF2) are in the form of two-beam interferometers which take the phase difference between the signals in the two interferometer arms as a basis for outputting a respective amplitude value.

8. The optical regenerator as claimed in claim 1, characterized
   in that the unit for correcting the phase errors (KP) contains an optically nonlinear medium in which the amplitude of the correction signal (KS) is taken as a basis for setting the phase of the second data signal (DS2).

9. The optical regenerator as claimed in claim 8, characterized
   in that the unit for correcting the phase errors (KP) is in the form of a series circuit comprising a semiconductor amplifier (SOA) with a downstream circulator (Z), wherein the semiconductor amplifier (SOA) has an input for the second data signal (DS2), and the circulator (Z) has an input (E) for the correction signal (KS), a first output (A1) for the correction signal (KS) and a second output (A2) for the regenerated data signal (DSK).

10. The optical regenerator as claimed in claim 8, characterized
    in that the unit for correcting the phase errors (KP) is in the form of a series circuit comprising an optically controllable level adjuster (OSP) with a downstream optically nonlinear medium (F), wherein the optically controllable level adjuster (OSP) has a first input for the correction signal (KS) and a second input for the second data signal (DS2).

11. The optical regenerator as claimed in claim 10, characterized
    in that the optically nonlinear medium (F) is in the form of a transmission fiber or in the form of a semiconductor amplifier.

12. The optical regenerator as claimed in claim 10, characterized
    in that the optically nonlinear medium (F) is followed by a second unit for level control (PN2).

13. The optical regenerator as claimed in claim 10, characterized
    in that the signal path contains units for signal delay or propagation time setting.

14. The optical regenerator as claimed in claim 10, characterized in that the unit for bit-by-bit level control (PN, PN1) is in the form of a nonlinear loop interferometer with an inserted directional attenuator.

15. A phase error ascertainment unit (EP) for an optical regenerator as claimed in claim 1, characterized
in that a splitter (SPEP) having two outputs is provided,
in that the first output of the splitter (SPEP) is connected to an input of an interferometric arrangement having a delay unit (DLEP), an optically controllable phase shifter (PSH) and a first interferometer (IF1),
in that the second output of the splitter (SPEP) is connected to an input of a second interferometer (IF2), and
in that an output of the second interferometer (IF2) is connected to the optically controllable phase shifter (PSH) via a level adjuster (PAEP).

16. The phase error ascertainment unit (EP) as claimed in claim 15, characterized
in that the optically controllable phase shifter (PSH) is in a form such that the transmission value which is present at the output of the second interferometer (IF2) is taken as a basis for effecting a phase shift by $\pi$.

17. The phase error ascertainment unit (EP) as claimed in claim 15, characterized
in that the first interferometer (IF1) is in a form such that a characteristic curve for the first interferometer (IF1), which characteristic curve represents a correlation between phase and transmission, is shifted by a phase difference of $\pi/2$ modulo $2\pi$ in comparison with a corresponding characteristic curve for the second interferometer (IF2).

18. The phase error ascertainment unit (EP) as claimed in claim 15, characterized
in that the optically controllable phase shifter (PSH) is arranged in one interferometer arm of the first interferometer (IF1).

19. The phase error ascertainment unit (EP) as claimed in claim 15, characterized
in that the optically controllable phase shifter (PSH) is arranged upstream of the input of the first interferometer (IF1).

20. The phase error ascertainment unit (EP) as claimed in claim 15, characterized
in that the first interferometer (IF1) and the second interferometer (IF2) are in the form of two-beam interferometers which take the phase difference between the signals in the two interferometer arms as a basis for outputting a respective amplitude value.

21. A method for optical regeneration,
in which the same amplitude is set for each symbol of a differential phase shift keyed data signal (DS), characterized
in that a phase error is ascertained for each symbol of the differential phase shift keyed data signal,
in that each symbol of the data signal is corrected with a signal which is proportional to the ascertained phase error in the symbol of the data signal, so that a differential phase shift keyed data signal (DSK) whose amplitude and whose phase have been regenerated is produced.

* * * * *